US008047435B2

(12) United States Patent
Johnson

(10) Patent No.: US 8,047,435 B2
(45) Date of Patent: Nov. 1, 2011

(54) SYSTEM AND METHOD FOR SECURED VOTING TRANSACTIONS

(75) Inventor: Neldon P. Johnson, Salem, UT (US)

(73) Assignee: N.P. Johnson Family Limited Partnership, Salem, UT (US)

( * ) Notice: Subject to any disclaimer, the term of this patent is extended or adjusted under 35 U.S.C. 154(b) by 373 days.

(21) Appl. No.: 11/701,102

(22) Filed: Jan. 31, 2007

(65) Prior Publication Data

US 2008/0184037 A1 Jul. 31, 2008

(51) Int. Cl.
*G06K 17/00* (2006.01)
*G07C 13/00* (2006.01)

(52) U.S. Cl. .......................................... 235/386; 235/51

(58) Field of Classification Search .................. 235/386, 235/51
See application file for complete search history.

(56) References Cited

U.S. PATENT DOCUMENTS

| | | | | |
|---|---|---|---|---|
| 5,875,432 | A | 2/1999 | Sehr | 705/12 |
| 6,081,793 | A | 6/2000 | Challener et al. | 705/50 |
| 2002/0074399 | A1 | 6/2002 | Hall et al. | 235/386 |
| 2002/0133396 | A1 | 9/2002 | Barnhart | 705/12 |
| 2003/0136835 | A1 * | 7/2003 | Chung et al. | 235/386 |
| 2007/0069019 | A1 * | 3/2007 | David | 235/386 |
| 2007/0187498 | A1 * | 8/2007 | Haas | 235/386 |
| 2007/0241190 | A1 * | 10/2007 | Hotto et al. | 235/386 |
| 2008/0072063 | A1 * | 3/2008 | Takahashi et al. | 713/186 |

* cited by examiner

*Primary Examiner* — Daniel Hess
*Assistant Examiner* — David Tardif
(74) *Attorney, Agent, or Firm* — J. David Nelson

(57) ABSTRACT

A secured electronic system and method for taking and counting votes. A database of unique ballot security codes, each ballot security code consisting of a ballot code representing the ballot selections of a voter and a security code derived from sensing with a biometric sensor a biometric presentation of a biometric feature of the voter. Each ballot security code is checked before entry into the database to verify that the security code component is not within a voter template of the security code component for any prior ballot security code, to prevent multiple votes being cast by any voter. Recounts are validated by verifying the uniqueness of the security code component of each ballot security code and verifying that each security code is not within a voter template of any other security code. Each ballot security code may also be checked against a registration data base thereby verifying that the voter is registered.

40 Claims, 2 Drawing Sheets

SYSTEM AND METHOD FOR SECURED VOTING TRANSACTIONS

FIELD OF THE INVENTION

This invention is in the field of electronic voting systems and methods and in particular systems and methods utilizing digital computer databases for voting transactions.

BACKGROUND OF THE INVENTION

The voting controversy arising from the year 2000 United States presidential election, and in particular the vote count controversy in State of Florida, has led to the implementation of more modernized voting and vote counting systems in much of the United States. State and Federal laws have since mandated certain voting system improvements while at the same time providing limited federal financial assistance for voting system improvements.

At the time of the 2000 election, many areas of the United States were still using antiquated voting systems, including paper ballots that were counted by hand, paper ballots that were counted by machine, and punch card ballots that were machine tabulated. The punch card ballots led to the “chad” controversy in Florida. Some states and some voting districts in other states had previously converted to various forms of electronic or computerized voting.

By the time of the 2006 mid-term election, most voting districts in the United States had upgraded to computerized voting systems. As the election approached, increasing concern was voiced over the accuracy, security, and integrity of such voting systems. In particular concerns over the potential for error or fraud in vote taking and vote counting were widely expressed. Considering the well known error and fraud experiences of ordinary citizens and institutions, such as credit card companies, with computerized systems and data bases, serious questions were raised regarding the overall reliability and security of the new computerized voting systems. The concerns were most prevalent in voting districts where no paper record of votes cast were to be generated. The systems deployed by those districts provided essentially no means for independently checking the vote tabulation in the event of allegations of vote counting irregularities or fraud.

It is an objective of the present invention to provide a computerized system and method for vote taking and vote counting which eliminates or substantially reduces the possibility of vote taking or vote counting error or fraud.

It is a further objective of the present invention to provide a computerized data base for vote taking and vote counting which eliminates or substantially reduces the possibility of vote taking or vote counting error or fraud.

It is a further objective of the present invention to provide a computerized system and method for voter registration which eliminates or substantially reduces the possibility of vote taking or vote counting error or fraud.

It is a further objective of the present invention to provide a computerized data base for voter registration which eliminates or substantially reduces the possibility of vote taking or vote counting error or fraud.

It is a further object of the present invention to provide a ballot database of unique ballot security codes wherein each ballot security code is comprised of a unique digital biometric security code generated from a biometric feature of a voter, which is appended to or linked to a digital ballot code from a ballot transaction completed by the voter.

It is a further object of the present invention to provide a registration database of unique registration security codes wherein each registration security code is comprised of a unique digital biometric security code generated from a biometric feature of a voter, which is appended to or linked to a digital registration code from a registration transaction completed by the voter.

It is a further object of the present invention to provide a transaction database of unique voter transaction security codes wherein each voter transaction security code is comprised of a unique digital biometric security code generated from a biometric feature of a voter, which is appended to or linked to a digital voter transaction code from a voter transaction completed by the voter.

SUMMARY OF THE INVENTION

The system and method of the present invention generates a ballot security code for a voter transaction which is comprised of a ballot code and a security code. A voter initiates a ballot transaction by presenting a biometric feature of the voter, such as a fingerprint, to a biometric sensor, which may be positioned at a voting terminal in a voting booth. The biometric sensor produces a biometric sensor code derived from the presentment of the biometric feature.

The voting terminal may include a touch screen on which the ballot options are displayed and on which the voter may make ballot selections. The ballot selections may be transmitted to the data base computer where the ballot code is generated based upon the ballot selections of the voter, or the ballot code may be generated by the voter terminal or by a voting district computer and transmitted to the data base computer.

A data base program, which may be loaded on the voting terminal or may loaded on a data base computer which is in communication with one or more voting terminals, may then perform one or more steps utilizing the biometric sensor code. If more than one type of biometric sensor are being utilized by the voting terminals which are in communication with the central computer, the central computer may recognize the type of biometric sensor and generate a biometric security code of a consistent format for each biometric sensor code. For alternative embodiments, the security code may be identical to the biometric sensor code. This would generally require that all of the biometric sensors for which biometric sensor codes are being transmitted to the data base computer are identical and are calibrated uniformly. To function effectively, biometric identification systems must allow for variation in the presentation of the biometric feature and the resultant biometric sensor code. This inherent and unavoidable variation in the biometric sensor code is an important attribute for a biometric identification system for use with the system and method of the present invention. A biometric identification system that generates an identical code each time that a given biometric feature of a respective voter is presented would be not be preferred for use with the system and method of the present invention. The fingerprint identification system disclosed in U.S. Pat. No. 5,598,474, to Johnson, the present inventor, is preferred for use with the present invention.

While the alternative embodiment of the present invention described below provides for voter identity verification through the use of a biometric identification system as well as providing for the generation of a security code, other embodiments may simply use a biometric sensor to generate the security code and include no biometric identification functions other than to verify that the voter has not engaged in the same transaction previously, e.g., has not voted previously or has not registered previously.

The data base program may generate a voter template through use of the security code generated for each voter. The voter template may consist of a variance range of security code values which define the range that the security code for a voter can vary for any respective presentation of the biometric feature of the voter and the voter's identity confirmed. The ballot security code and the voter template may then be stored in the ballot database, either appended to the ballot code for one or more ballot selections made by the voter as a ballot security code, or separately stored and linked to the ballot code for one or more ballot selections made by the voter. A further alternative may provide for only the voter template to be appended or linked to the ballot code. The ballot database may be stored in a data base memory which may be integrated with the memory of the data base computer where the data base program is operated or may constitute one or more separate memory units.

If a subsequent security code, or the security code component of a subsequent ballot security code, is presented to or generated by the data base program from a biometric sensor code for a subsequent voter transaction, and it falls within a voter template for a previously stored security code or within a previously stored voter template, the subsequent voter transaction would be rejected as an attempt by a voter to vote more than once.

Further, if an identical ballot security code or a ballot security code with an identical security code is presented to or generated by the data base program for a purported subsequent voter transaction, the subsequent voter transaction would be rejected as a fraudulent reproduction and reuse of a previously completed voter transaction.

Thus by accepting only those ballot security codes for which the security code component does not fall within the voter template for a previously completed voter transaction, voters will be prohibited from voting more than once. Presentations of identical security codes or identical ballot security codes to the data base program will result in the immediate identification of an attempt at fraudulent duplication or reuse of a voter transaction, and the attempt will be rejected.

The data base against which each voter transaction is checked can be as extensive as is desired. The data base can be voting precinct, voting district, state, regional, or national. In the event of a question or concern about the validity or integrity of a vote count, each of the ballot security codes may be recalled and the uniqueness of each such code verified as the recount is completed. In the event that a recount is deemed necessary, all of the ballot security codes for the election may be recalled from the data base and the validity of the ballot code for each voter transaction can be verified by verifying the uniqueness of the ballot security code or the security code component of each ballot security code. The ballot selections for each voter may then be extracted from the ballot code component of the ballot security code and the recount tabulated for any ballot race or issue in question.

Embodiments of the method and data base of the present invention may provide for the security code to be appended to, incorporated in, or linked to a ballot code generated for each ballot selection, for a group of ballot selections, or the ballot selections for the entire ballot. The ballot code may consist of as many bits or digits as are necessary to accurately transmit the ballot selections of the voter. Likewise, the security code may consist of as many bits or digits as is necessary or desirable to provide for a desired resolution for the security code.

An alternative embodiment of the system and method of the present invention also incorporates voter registration. A registration security code comprised of a biometric security code may be appended or linked to a registration code. The registration code may simply be a digital code for the name and address of the voter or may include additional registration information for the voter such as the political party of the voter. The registration code may utilize as many bits or digits as are necessary to accurately represent, transmit, and store the registration information. The security code may be determined in a manner similar to that for voting, from a biometric sensor code generated by presentment by the voter of a biometric feature to a biometric sensor at the time of registration. A voter registration template may also be generated from the security code and a variance range and may be stored in the registration data base or the data base program may generate a voter registration template from the security code at the time that voter registration verification is desired. The registration of the voter may be accepted if the registration security code or the security code for the voter does not fall within the registration template for any previously registered voter. The registration data base may be limited to a voting precinct, a voting district, or a state, or may be nationwide.

If the voter reports that she or he has relocated and seeks registration at a new address, the registration security code for the previous registration of the voter may be replaced with a new registration security code reflecting the new name and address of the voter. It may also incorporate a new security code based upon a current presentation of the biometric feature, which may then be used to generate a new registration template.

If the registration of the voter is accepted and the registration security code is stored in the registration data base, it may subsequently be used to verify the registration of the voter at the time the voter reports to the voter's voting precinct on election day. This may be accomplished by the data base program comparing the security code for the biometric presentation of the voter at the voting terminal biometric sensor with the security code components of the registration security codes stored in the registration data base. If the security code generated based upon the biometric code from the voting terminal biometric sensor falls within a voter registration template for any of the security codes from the registration data base, then registration is verified. Once voter registration in the voting precinct is confirmed, the voter would be allowed to proceed with voting. Registration confirmation and authorization to vote may be automated, with the voter merely presenting a biometric feature to a biometric sensor at a voting terminal and being allowed to vote when registration is confirmed.

The ballot code for each voting transaction typically includes a plurality of ballot code fields which are appended together to create the ballot code. The number of code fields and the size of the code fields, i.e. the number of digits or bits, may vary greatly, and the respective code fields may, for example, comprise digital codes for voting date, voting time, and each voting selection. The respective code fields may also include code identifiers or code delimiters identifying the start or finish of a code field and/or the nature of code contained in the code field.

As described above, whether it is a registration transaction or a voting transaction, Inherent and unavoidable variance in the presentation of the biometric feature and the very high degree of resolution of biometric sensors result in the digital security code being unique and irreproducible. In other words for each presentation of the biometric feature by the voter, a unique security code will be generated. The effect of the generation of the ballot security code is that the ballot code is locked up and inaccessible for misappropriation or misuse.

The ballot security code for voting transaction is transmitted to a ballot security code database.

DETAILED DESCRIPTION

Figure 1:
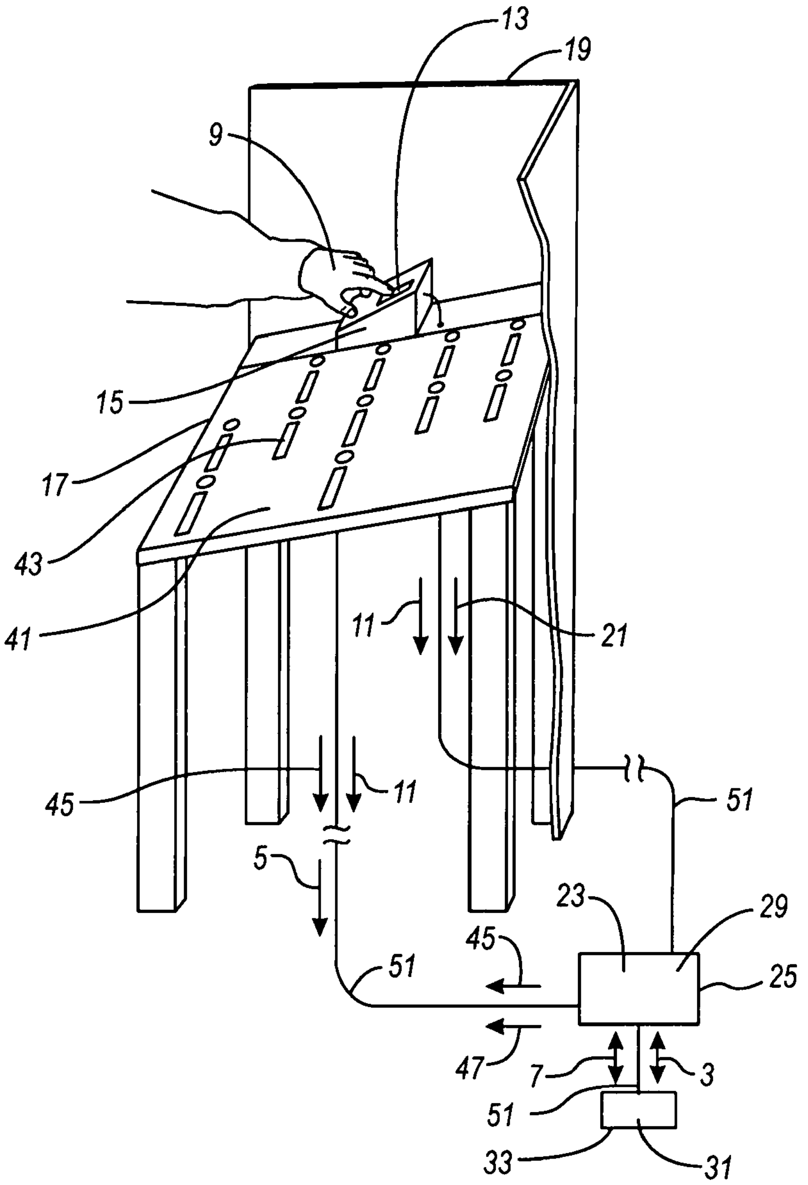
FIG. 1 is a schematic flow chart of a preferred embodiment of the method of the present invention.
Figure 2:
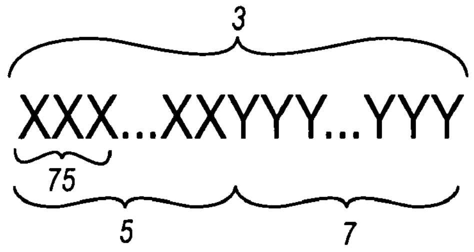
FIG. 2 is an illustration of the structure of a ballot security code of the present invention with a biometric security code appended to a ballot code.

Referring to FIG. 1, a schematic flow chart 1 of a preferred method of the present invention is shown for generating a ballot security code 3, a preferred embodiment of which is illustrated in FIG. 2. For this embodiment, the ballot security code 3 is comprised of a ballot code 5 and a security code 7. A voter 9 initiates a ballot transaction 11 by presenting a biometric feature 13 of the voter, such as a fingerprint, to a biometric sensor 15, which may be positioned at a voting terminal 17 in a voting booth 19. The biometric sensor produces a biometric sensor code 21 derived from the presentment of the biometric feature.

The voting terminal may include a touch screen 41 on which the ballot options 43 are displayed and on which the voter may make ballot selections. The ballot selections 45 may be transmitted to the data base computer 25 where the ballot code 5 is generated based upon the ballot selections of the voter, or the ballot code may be generated by the voter terminal or by a voting district computer and transmitted to the data base computer.

A data base program 23, which may be loaded on the voting terminal or may loaded on a data base computer 25 which is in communication with one or more voting terminals, may then perform one or more steps utilizing the biometric sensor code. If more than one type of biometric sensor are being utilized by the voting terminals which are in communication with the central computer, the central computer may recognize the type of biometric sensor and generate a biometric security code 7 of a consistent format for each biometric sensor code. For alternative embodiments, the security code may be identical to the biometric sensor code. This would generally require that all of the biometric sensors for which biometric sensor codes are being transmitted to the data base computer are identical and are calibrated uniformly.

To function effectively, biometric identification systems must allow for variation in the presentation of the biometric feature and the resultant biometric sensor code. Even the unavoidable variation in the amount of pressure exerted by the voter on the biometric sensor at the time of the presentation of the biometric feature will result in a variation in the biometric sensor code generated by a biometric sensor with reasonable resolution. Thus, an acceptance variance or range of security code values must be established for an effective biometric identification system in order to attempt to minimize the occurrence of false acceptance or false rejection of the voter. The acceptance variance or range is referred to herein as a "voter template". However, this inherent and unavoidable variation in the biometric sensor code is an important attribute for a biometric identification system for use with the system and method of the present invention. A biometric identification system that generates an identical code each time that a given biometric feature of a respective voter is presented would be not be preferred for use with the system and method of the present invention. The fingerprint identification system disclosed in U.S. Pat. No. 5,598,474, to Johnson, the present inventor, is preferred for use with the present invention. Even for biometric identification systems that attempt to force the user to present the biometric feature in the same way each time or utilize a biometric sensor with poor resolution, the biometric sensor code generated will ordinarily have enough inherent and unavoidable variation that the use of the biometric code for a ballot security code will result in a statistically unique and statistically irreproducible ballot security code.

While the alternative embodiment of the present invention described below provides for voter identity verification through the use of a biometric identification system as well as providing for the generation of a security code, other embodiments may simply use a biometric sensor to generate the security code and include no biometric identification functions other than to verify that the voter has not engaged in the same transaction previously, e.g., has not voted previously or has not registered previously.

The data base program may generate a voter template 29 through use of the security code generated for each voter. The voter template may consist of a variance range of security code values which define the range that the security code for a voter can vary for any respective presentation of the biometric feature of the voter and the voter's identity confirmed. The variance range would thus encompass the range of values in the security code that would reasonably be expected to be include the security code generated for successive presentations of the biometric feature by the voter and would be statistically unique and non-overlapping for each person. The data base program may simply generate a respective voter template, at the time that a subsequent security code is presented, for the security code component of the ballot security code of each stored ballot security code as the subsequent security code is presented for comparison with each security code of the stored data base. Alternatively, a voter template can be generated for each security code component of each ballot security code at the time each ballot security code is presented. The ballot security code and the voter template may then be stored in the ballot database 31, either appended to the ballot code 5 for one or more ballot selections made by the voter on the voter terminal 17 as a ballot security code, or separately stored and linked to the ballot code for one or more ballot selections made by the voter. A further alternative may provide for only the voter template to be appended or linked to the ballot code. The ballot database may be stored in a data base memory 33 which may be integrated with the memory of the data base computer where the data base program is operated or may constitute one or more separate memory units.

The communication links 51 between the biometric sensor 15, the voter terminal 17, the data base computer 25, the data base memory 33 and other components of the system may be wire, wireless, satellite, internet, or any other electronic communication means, which will be known to persons skilled in the art or which may developed in the future as a result of advances in communications or computer technology. Computer functions, such as software storage and execution, data processing, data storage, and data retrieval, such as that shown for the data base computer, may be performed by one or more computers at one or more locations, through the use of hardware and software that will be known to persons skilled in the art. Future advances in computer technology will likely provide additional hardware and software that may be utilized for the system and method of the present invention. The term “computer” used in this application shall thus be defined to include but not be limited to one or more computers or one or more collections of computer components at one or more locations. The term “storage” shall be defined to include but not be limited to one or more electronic data storage components at one or more locations.

If a subsequent security code, or the security code component of a subsequent ballot security code, is presented to or generated by the data base program from a biometric sensor code for a subsequent voter transaction, and it falls within a voter template for a previously stored security code or within a previously stored voter template, the subsequent voter transaction would be rejected as an attempt by a voter to vote more than once. The data base computer may transmit a voter rejection notification 45 to the voter, and also to an election official if desired, at the time the voter makes a biometric presentation to the biometric sensor, or alternatively, at the time the voter submits the voter’s ballot selections. A ballot acceptance notification 47 may also be transmitted from the data base computer, from the voting terminal, or from a voting precinct or district computer, if a voter rejection notification is not received from the data base computer.

Further, if an identical ballot security code or a ballot security code with an identical security code is presented to or generated by the data base program for a purported subsequent voter transaction, the subsequent voter transaction would be rejected as a fraudulent reproduction and reuse of a previously completed voter transaction.

Thus by accepting only those ballot security codes for which the security code component does not fall within the voter template for a previously completed voter transaction, voters will be prohibited from voting more than once. Presentations of identical security codes or identical ballot security codes to the data base program will result in the immediate identification of an attempt at fraudulent duplication or reuse of a voter transaction, and the attempt will be rejected.

The data base against which each voter transaction is checked can be as extensive as is desired. The data base can be voting precinct, voting district, state, regional, or national. This may prevent fraudulent registrations by a voter in more than one precinct, district or state, and prevent a voter from voting more than once in a given election. It would also prevent the fraudulent importation or reuse of any voter transaction. Each ballot code, which contains the data from one or more ballot selections by a voter, would be appended to or linked to a unique security code, thereby generating a unique ballot security code. Thus, in the event of a question or concern about the validity or integrity of a vote count, each of the ballot security codes may be recalled and the uniqueness of each such code verified as the recount is completed Due to the uniqueness of the biometric features of each voter, particularly fingerprints, and further due to the inherent statistical uniqueness of a biometric presentment of a biometric feature, the biometric sensor code generated from a presentment of the biometric feature by the voter to the biometric sensor will be unique. A security code generated based upon the biometric sensor code will also be unique. The biometric sensor code may be the security code for some embodiments. Thus in the event that a recount is deemed necessary, all of the ballot security codes for the election may be recalled from the data base and the validity of the ballot code for each voter transaction can be verified by verifying the uniqueness of the ballot security code or the security code component of each ballot security code. The ballot selections for each voter may then be extracted from the ballot code component of the ballot security code and the recount tabulated for any ballot race or issue in question. If any questions remain regarding the validity of the vote taking or the validity of the vote counting, as many voters as deemed necessary can voluntarily present for a verification of the accuracy of their vote. By presenting the biometric feature at a biometric sensor, the ballot security code for the voter can be identified through the use of the voter template. The ballot code can then be extracted from the ballot security code and the ballot selections of the voter produced. The accuracy of the vote taking and vote count for the voter can then be verified.

Embodiments of the method and data base of the present invention may provide for the security code to be appended to, incorporated in, or linked to a ballot code generated for each ballot selection, for a group of ballot selections, or the ballot selections for the entire ballot. The ballot security code 3 illustrated in FIG. 2, is comprised of a ballot code 5 appended to a security code 7. The ballot code may consist of as many bits or digits as are necessary to accurately transmit the ballot selections of the voter. Likewise, the security code may consist of as many bits or digits as is necessary or desirable to provide for a desired resolution for the security code.

Figure 3:
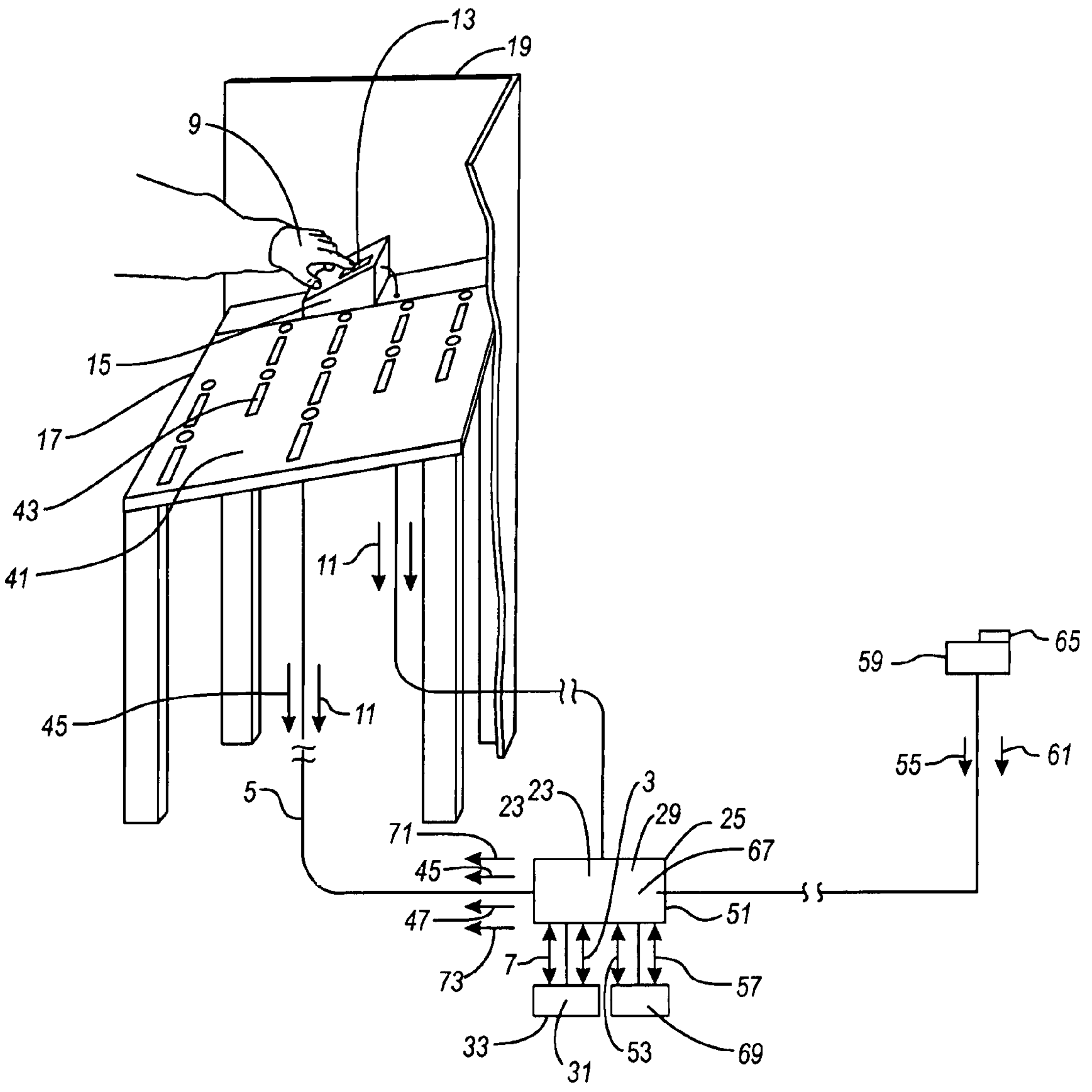
FIG. 3 is a schematic flow chart of an alternative preferred embodiment of the method of the present invention incorporating voter registration.
Figure 4:
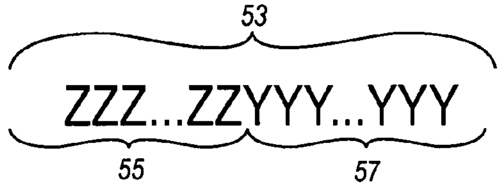
FIG. 4 is an illustration of the structure of a registration security code of the present invention with a biometric security code appended to a registration code.

Referring now to FIG. 3, a schematic flow chart of an alternative embodiment of the method of the present invention incorporating voter registration at a registration station 59 is shown. Referring also to FIG. 4, a registration security code 53 of the present invention comprised of a biometric security code 57 appended to a registration code 55 is shown. As with the ballot security codes described above, the security code may be appended to or linked to the registration code in a manner which will be known to persons skilled in the art. The registration code may simply be a digital code for the name and address of the voter or may include additional registration information for the voter such as the political party of the voter. The registration code may utilize as many bits or digits as are necessary to accurately represent, transmit, and store the registration information. The security code may be determined, in a manner similar to that described above for voting, from a biometric sensor code 61 generated by presentment by the voter of a biometric feature to a biometric sensor 65 at the time of registration. For some embodiments, the biometric sensor code may be the security code. The security code 57 may be generated from the biometric sensor code at the registration station. It also may be generated by the data base program at the data base computer 25 as shown in FIG. 3. A voter registration template 67 may also be generated from the security code and a variance range and may be stored in the registration data base 69 along with the registration security code. Alternative embodiments may provide for the data base program to generate a voter registration template from the security code at the time that voter registration verification is desired. Other alternative embodiments may provide that only the voter registration template is stored for the voter at the time of registration.

The registration of the voter may be accepted if the registration security code or the security code for the voter does not fall within the registration template for any previously registered voter. If the registration security code falls within the registration template of a previously registered voter, then the voter may be deemed to be attempting to register more than once, perhaps under the same name and address. If the security code falls within the registration template of a previously registered voter, then the voter may be deemed to be attempting to register more than once, perhaps under more than one name or at more than one address. The registration data base may be limited to a voting precinct, a voting district, or a state, or may be nationwide.

If the voter reports that she or he has relocated and seeks registration at a new address, the registration security code for the previous registration of the voter may be replaced with a new registration security code reflecting the new name and address of the voter. It may also incorporate a new security code based upon a current presentation of the biometric feature, which may then be used to generate a new registration template.

If the registration of the voter is accepted and the registration security code is stored in the registration data base, it may subsequently be used to verify the registration of the voter at the time the voter reports to the voter's voting precinct on election day, as is illustrated by the embodiment of the present invention shown in FIG. 3. This may be accomplished by the data base program comparing the security code 7 for the biometric presentation of the voter at the voting terminal biometric sensor 15 with the security code 57 components of the registration security codes stored in the registration data base 69. If the security code generated based upon the biometric code from the voting terminal biometric sensor falls within a voter registration template for any of the security codes from the registration data base, then registration is verified. The data base computer may then transmit a registration confirmation notification 71 to the voter terminal and the voter will be allowed to proceed with making ballot selections. Alternatively, registration confirmation can be made at the time that the voter seeks to transmit the voter's ballot selections. If the security code generated based upon the biometric code from the voting terminal sensor does not fall within a voter registration template of any of the security codes in the voter registration data base, a voter non-registration notification may be transmitted to the voter terminal, and also to an election official if desired. The voter would then not be allowed to make ballot selections or would the voter would not be able to transmit the voter's ballot selections.

Once voter registration in the voting precinct is confirmed, the voter would be allowed to proceed with voting. Registration confirmation and authorization to vote may be automated, with the voter merely presenting a biometric feature to a biometric sensor at a voting terminal and being allowed to vote when registration is confirmed. Since the confidentiality of the votes cast by the voter is essential, the registration code information will not be appended to the ballot security code generated from the voter selections and the security code.

Registration verification may also be made by an election official through the presentation of a biometric feature by the voter to a biometric sensor operated and monitored by the election official. Once the registration of the voter is confirmed, the voter may be given a voter card that may be inserted in a voter terminal that will allow the voter to vote one and only one ballot. Alternatively, after registration is confirmed by an election official through a presentation of the biometric feature of the voter, the voter may access a voting terminal by presentation of the biometric feature once again to a sensor at the voting terminal.

Referring again to FIG. 2, the ballot code for each voting transaction typically includes a plurality of ballot code fields 75 which are appended together, as illustrated in FIG. 2, to create the ballot code 5. The number of code fields and the size of the code fields, i.e. the number of digits or bits, may vary greatly, and the respective code fields may, for example, comprise digital codes for voting date, voting time, and each voting selection. The respective code fields may also include code identifiers or code delimiters identifying the start or finish of a code field and/or the nature of code contained in the code field.

As described above, whether it is a registration transaction or a voting transaction, the voter may present a biometric feature to a biometric sensor 15 of a biometric identification system 17. The biometric identification system generates a digital biometric security code 7 based upon the presentation of the biometric feature of the voter. Unavoidable variance in the presentation of the biometric feature and the very high degree of resolution of biometric sensors result in the digital security code being unique and irreproducible. In other words for each presentation of the biometric feature by the voter, a unique security code will be generated. The ballot security code 3 that is produced is statistically irreproducible since subsequent presentations of the biometric feature, even by the same voter, will not generate the same security code. The effect of the generation of the ballot security code is that the ballot code is locked up and inaccessible for misappropriation or misuse. The ballot security code for voting transaction is transmitted to a ballot security code database 31.

As noted above, the foregoing method may or may not be used in conjunction with the use of the biometric sensor and the biometric identification system to verify the identity of the voter based upon a registration data base and authorize voting by the voter.

Other embodiments and other variations and modifications of the embodiments described above will be obvious to a person skilled in the art. Therefore, the foregoing is intended to be merely illustrative of the invention and the invention is limited only by the following claims and the doctrine of equivalents.

What is claimed is:

1. Method for taking and counting votes of a plurality of voters for an election comprising:

a) sensing, with a biometric sensor, a biometric presentation of a biometric feature of each voter, the biometric presentation being made by the voter for a desired voting transaction for the election, the biometric presentation being inherently statistically unique and irreproducible and the biometric sensor having a resolution which is sufficient to detect the uniqueness and irreproducibility of the biometric presentation, resulting in the generation of a statistically unique and irreproducible security code for the biometric presentation;

b) comparing the security code with stored security codes stored previously in an election database for the election to determine if the security code is within a voter template of any of the stored security codes, determining if the voter has voted previously;

c) if the voter has not voted previously, accepting ballot selections of the voter for the election and generating a ballot code based upon the ballot selections;

d) appending or linking the unique and irreproducible security code to the ballot code, generating a unique and irreproducible ballot security code;

e) storing the ballot security code in the election database;

f) completing a vote count for the plurality of voters by extracting and counting the ballot selections of each voter from the election database; and g) comparing a plurality of the security codes of the election database with a prior election database to determine if any of the security codes from the prior election has been fraudulently reused for any of the compared security codes of the election data base to generate a fraudulent ballot security code for the election.

2. Method as recited in claim 1 further comprising confirming the validity of the vote count by confirming that the security code component of each ballot security code is unique.

3. Method as recited in claim 1 further comprising confirming the validity of the vote count by confirming that each ballot security code is unique.

4. Method as recited in claim 1 further comprising completing a recount of ballot selections by re-extracting and recounting the ballot selections of each voter from the database.

5. Method as recited in claim 4 further comprising confirming the validity of the recount by confirming that the security code component of each ballot security code is unique.

6. Method as recited in claim 4 further comprising confirming the validity of the recount by confirming that each ballot security code is unique.

7. Method as recited in claim 1 wherein the voter makes ballot selections in reference to a ballot with one or more ballot issues and the method further comprises completing a recount for one or more selected ballot issues by re-extracting and recounting the ballot selections for the selected ballot issues for each voter from the database.

8. Method as recited in claim 7 further comprising confirming the validity of the recount by confirming that the security code component of each ballot security code is unique.

9. Method as recited in claim 7 further comprising confirming the validity of the recount by confirming that each ballot security code is unique.

10. Method as recited in claim 1 further comprising comparing the security code for each voter with a registration database to verify that the voter is appropriately registered to vote and accepting ballot selections of the voter for the election and generating a ballot code based upon the ballot selections if and only if the voter is appropriately registered to vote.

11. Method as recited in claim 1 further comprising printing a paper record of the ballot selections of each voter as the ballot selections of each voter are accepted, with the security code being printed with the paper record.

12. Method as recited in claim 1 further comprising printing a paper record of the ballot selections of each voter as the ballot selections of each voter are accepted, with the ballot security code being printed with the paper record.

13. Method as recited in claim 1 further comprising printing a paper record of the ballot security code for each voter as the ballot selections for each voter are accepted.

14. Method as recited in claim 1 wherein the biometric sensor generates a statistically unique and irreproducible biometric sensor code from the biometric presentation of the biometric feature of the voter, and the statistically unique and irreproducible biometric security code is determined based upon the biometric sensor code.

15. Method for taking and counting votes of a plurality of voters for an election comprising:

a) sensing, with a biometric sensor, a biometric presentation of a biometric feature of each voter, the biometric presentation being made by the voter for a desired voting transaction for the election, the biometric presentation being statistically unique and irreproducible, resulting in the generation of a statistically unique and irreproducible security code for the biometric presentation;

b) accepting ballot selections of the voter for the election and generating a ballot code based upon the ballot selections;

c) appending or linking the unique and irreproducible security code to the ballot code, generating a unique and irreproducible ballot security code;

d) comparing the ballot security code or the security code component of the ballot security code with stored codes stored previously in an election database for the election to determine if the ballot security code or the security code is within a voter template of any of the stored codes, determining if the voter has voted previously;

e) if the voter has not voted previously, accepting and storing the ballot security code in the database; completing a vote count for the plurality of voters by extracting and counting the ballot selections of each voter from the election database; and g) comparing a plurality of the security codes of the election database with a prior election database to determine if any of the security codes from the prior election has been fraudulently reused for any of the compared security codes of the election data base to generate a fraudulent ballot security code for the election.

16. Method as recited in claim 15 further comprising confirming the validity of the vote count by confirming that the security code component of each ballot security code is unique.

17. Method as recited in claim 15 further comprising confirming the validity of the vote count by confirming that each ballot security code is unique.

18. Method as recited in claim 15 further comprising completing a recount of ballot selections by re-extracting and recounting the ballot selections of each voter from the database.

19. Method as recited in claim 18 further comprising confirming the validity of the recount by confirming that the security code component of each ballot security code is unique.

20. Method as recited in claim 18 further comprising confirming the validity of the recount by confirming that each ballot security code is unique.

21. Method as recited in claim 15 wherein the voter makes ballot selections in reference to a ballot with one or more ballot issues and the method further comprises completing a recount for one or more selected ballot issues by re-extracting and recounting the ballot selections for the selected ballot issues for each voter from the database.

22. Method as recited in claim 21 further comprising confirming the validity of the recount by confirming that the security code component of each ballot security code is unique.

23. Method as recited in claim 21 further comprising confirming the validity of the recount by confirming that each ballot security code is unique.

24. Method as recited in claim 15 further comprising comparing the security code for each voter with a registration database to verify that the voter is appropriately registered to vote and accepting ballot selections of the voter for the election and generating a ballot code based upon the ballot selections if and only if the voter is appropriately registered to vote.

25. Method as recited in claim 15 further comprising printing a paper record of the ballot selections of each voter as the ballot selections of each voter are accepted, with the security code being printed with the paper record.

26. Method as recited in claim 15 further comprising printing a paper record of the ballot selections of each voter as the ballot selections of each voter are accepted, with the ballot security code being printed with the paper record.

27. Method as recited in claim 15 further comprising printing a paper record of the ballot security code for each voter as the ballot selections for each voter are accepted.

28. Method as recited in claim 15 wherein the biometric sensor generates a statistically unique and irreproducible biometric sensor code from the biometric presentation of the biometric feature of the voter, and the statistically unique and irreproducible biometric security code is determined based upon the biometric sensor code.

29. Method for taking and counting votes of a plurality of voters for an election comprising:

a) sensing, with a biometric sensor, a biometric presentation of a biometric feature of each voter, the biometric presentation being made by the voter for a desired voting transaction for the election, the biometric presentation being inherently statistically unique and irreproducible, resulting in the generation of a statistically unique and irreproducible security code for the biometric presentation;

b) comparing the security code with stored security codes stored previously in a registration database to determine if the security code is within a voter template of any of the stored security codes, determining if the voter is registered;

c) if the voter is registered, comparing the security code with stored security codes stored previously in an election database for the election to determine if the security code is within a voter template of any of the stored security codes, determining if the voter has voted previously;

d) if the voter has not voted previously, accepting ballot selections of the voter for the election and generating a ballot code based upon the ballot selections;

e) appending or linking the unique and irreproducible security code to the ballot code, generating a unique and irreproducible ballot security code;

f) storing the ballot security code in the election database;

g) completing a vote count for the plurality of voters by extracting and counting the ballot selections of each voter from the election database; and h) comparing a plurality of the security codes of the election database with a prior election database to determine if any of the security codes from the prior election has not been fraudulently reused for any of the compared security codes of the election data base to generate a fraudulent ballot security code for the election.

30. Method for taking and counting votes of a plurality of voters for an election comprising:

a) sensing, with a biometric sensor, a biometric presentation of a biometric feature of each voter, the biometric presentation being made by the voter for a desired voting transaction for the election, the biometric presentation being inherently statistically unique and irreproducible, resulting in the generation of a statistically unique and irreproducible security code for the biometric presentation;

b) comparing the ballot security code or the security code component of the ballot security code with stored codes stored previously in an election database for the election to determine if the ballot security code or the security code is within a voter template of any of the stored codes, determining if the voter has voted previously;

c) if the voter is registered, comparing the security code with stored security codes stored previously in an election database for the election to determine if the security code is within a voter template of any of the stored security codes, determining if the voter has voted previously;

d) if the voter has not voted previously, accepting ballot selections of the voter for the election and generating a ballot code based upon the ballot selections;

e) appending or linking the unique and irreproducible security code to the ballot code, generating a unique and irreproducible ballot security code;

f) storing the ballot security code in the election database;

g) completing a vote count for the plurality of voters by extracting and counting the ballot selections of each voter from the database; and h) comparing a plurality of the security codes of the election database with a prior election database to determine if any of the security codes from the prior election has been fraudulently reused for any of the compared security codes of the election data base to generate a fraudulent ballot security code for the election.

31. Method for completing voter transactions for a plurality of voters comprising:

a) sensing, with a biometric sensor, a biometric presentation of a biometric feature of each voter, the biometric presentation being made by the voter for a desired voter transaction, the biometric presentation being inherently statistically unique and irreproducible, resulting in the generation of a statistically unique and irreproducible security code for the biometric presentation;

b) comparing the security code with stored security codes stored previously in a voter transaction database to determine if the security code is within a voter template of any of the stored security codes, determining if the voter has previously completed the desired voter transaction;

c) if the voter has not previously completed the desired voting transaction, accepting the desired voting transaction and generating a voter transaction code based upon the desired voting transaction;

d) appending or linking the unique and irreproducible security code to the voter transaction code, generating a unique and irreproducible voter transaction security code;

e) storing the voter transaction security code in the voter transaction database; and f) comparing a plurality of the security codes of the voter transaction database with a prior voter transaction database to determine if any of the security codes from the prior voter transaction data base has been fraudulently reused for any of the compared security codes of the voter transaction database to generate a fraudulent ballot security code for the voter transaction database.

32. Method as recited in claim 31 wherein the biometric sensor generates a statistically unique and irreproducible biometric sensor code from the biometric presentation of the biometric feature of the voter, and the statistically unique and irreproducible security code is determined based upon the biometric sensor code.

33. Voting system for taking and counting votes of a plurality of voters for an election comprising:

one or more biometric sensors, each biometric sensor having a resolution capability for generation of a unique and irreproducible sensor code for a voter for an inherently unique and irreproducible presentation of a biometric feature by the voter;

one or more electronic voting terminals, each voting terminal having a capability for generating a ballot code for the voter based upon ballot selections by the voter at the terminal;

database of unique and irreproducible ballot security codes, each ballot security code comprised of a unique and irreproducible security code appended to or linked to a ballot code, the security code being determined based upon the sensor code;

prior election database of security codes of one or more prior elections;

biometric identification system having a capability for determining if the security code component of the ballot security code is within a voter template of the security code component of any previously stored ballot security code and for determining if any of the security codes from the prior election data base has been fraudulently reused to fraudulently generate the security code component of the ballot security code;

one or more computers for the database, the prior election database, and the biometric identification system; and communications links between the biometric sensors, the voting terminals, and the one or more computers.

34. Voting system for taking and counting votes of a plurality of voters for an election comprising:

database of unique and irreproducible ballot security codes, each ballot security code comprised of a unique and irreproducible security code appended to or linked to a ballot code;

one or more biometric sensors, each biometric sensor having a resolution providing for generation of a unique and irreproducible sensor code for an inherently unique and irreproducible presentation of a biometric feature by a voter;

prior election database of security codes of one or more prior elections;

biometric identification system for generating a unique and irreproducible security code for each unique and irreproducible sensor code and determining if the unique and irreproducible security code is within a voter template of the security code component of any ballot security code of the prior election database and for determining if any of the security codes from the prior election database has been fraudulently reused to fraudulently generate the security code component of the ballot security code;

one or more electronic voting terminals for generating a ballot code based upon ballot selections by the voter for the election and appending or linking the ballot code to the unique and irreproducible security code, generating a unique and irreproducible ballot security code;

one or more computers for the database, the prior election database, and the biometric identification system; and communications links between the biometric sensors, the voting terminals, and the one or more computers.

35. Method for taking and counting votes of a plurality of voters for an election comprising:

a) sensing, with a biometric sensor, a biometric presentation of a biometric feature of each voter, the biometric presentation being made by the voter for a desired voting transaction for the election, the biometric presentation being inherently statistically unique and irreproducible and the biometric sensor having a resolution which is sufficient to detect the uniqueness and irreproducibility of the biometric presentation, resulting in the generation of a statistically unique and irreproducible security code for the biometric presentation;

b) comparing the security code with stored security codes stored previously in an election database for the election to determine if the security code is within a voter template of any of the stored security codes, determining if the voter has voted previously;

c) if the voter has not voted previously, accepting ballot selections of the voter for the election and generating a ballot code based upon the ballot selections;

d) appending or linking the unique and irreproducible security code to the ballot code, generating a unique and irreproducible ballot security code;

e) storing the ballot security code in the election database;

f) completing a vote count for the plurality of voters by extracting and counting the ballot selections of each voter from the election database; and g) comparing a plurality of the security codes of the election data base with a registration database to determine if any of the security codes from the registration database has been fraudulently reused for any of the compared security codes of the election database to generate a fraudulent ballot security code for the election.

36. Method for taking and counting votes of a plurality of voters for an election comprising:

a) sensing, with a biometric sensor, a biometric presentation of a biometric feature of each voter, the biometric presentation being made by the voter for a desired voting transaction for the election, the biometric presentation being statistically unique and irreproducible, resulting in the generation of a statistically unique and irreproducible security code for the biometric presentation;

b) accepting ballot selections of the voter for the election and generating a ballot code based upon the ballot selections;

c) appending or linking the unique and irreproducible security code to the ballot code, generating a unique and irreproducible ballot security code;

d) comparing the ballot security code or the security code component of the ballot security code with stored codes stored previously in an election database for the election to determine if the ballot security code or the security code is within a voter template of any of the stored codes, determining if the voter has voted previously;

e) if the voter has not voted previously, accepting and storing the ballot security code in the database;

f) completing a vote count for the plurality of voters by extracting and counting the ballot selections of each voter from the election database; and g) comparing a plurality of the security codes of the election data base with a registration database to determine if any of the security codes from the registration database has been fraudulently reused for any of the compared security codes of the election database to generate a fraudulent ballot security code for the election.

37. Method for taking and counting votes of a plurality of voters for an election comprising:

a) sensing, with a biometric sensor, a biometric presentation of a biometric feature of each voter, the biometric presentation being made by the voter for a desired voting transaction for the election, the biometric presentation being inherently statistically unique and irreproducible, resulting in the generation of a statistically unique and irreproducible security code for the biometric presentation;

b) comparing the security code with stored security codes stored previously in a registration database to determine if the security code is within a voter template of any of the stored security codes, determining if the voter is registered;

c) if the voter is registered, comparing the security code with stored security codes stored previously in an election database for the election to determine if the security code is within a voter template of any of the stored security codes, determining if the voter has voted previously;

d) if the voter has not voted previously, accepting ballot selections of the voter for the election and generating a ballot code based upon the ballot selections;

e) appending or linking the unique and irreproducible security code to the ballot code, generating a unique and irreproducible ballot security code;

f) storing the ballot security code in the election database;

g) completing a vote count for the plurality of voters by extracting and counting the ballot selections of each voter from the election database; and h) comparing a plurality of the security codes of the election data base with a registration database to determine if any of the security codes from the registration database has been fraudulently reused for any of the compared security codes of the election database to generate a fraudulent ballot security code for the election.

38. Method for taking and counting votes of a plurality of voters for an election comprising:

a) sensing, with a biometric sensor, a biometric presentation of a biometric feature of each voter, the biometric presentation being made by the voter for a desired voting transaction for the election, the biometric presentation being inherently statistically unique and irreproducible, resulting in the generation of a statistically unique and irreproducible security code for the biometric presentation;

b) comparing the ballot security code or the security code component of the ballot security code with stored codes stored previously in an election database for the election to determine if the ballot security code or the security code is within a voter template of any of the stored codes, determining if the voter has voted previously;

c) if the voter is registered, comparing the security code with stored security codes stored previously in an election database for the election to determine if the security code is within a voter template of any of the stored security codes, determining if the voter has voted previously;

d) if the voter has not voted previously, accepting ballot selections of the voter for the election and generating a ballot code based upon the ballot selections;

e) appending or linking the unique and irreproducible security code to the ballot code, generating a unique and irreproducible ballot security code;

f) storing the ballot security code in the election database;

g) completing a vote count for the plurality of voters by extracting and counting the ballot selections of each voter from the election database; and h) comparing a plurality of the security codes of the election data base with a registration database to determine if any of the security codes from the registration database has been fraudulently reused for any of the compared security codes of the election database to generate a fraudulent ballot security code for the election.

39. Voting system for taking and counting votes of a plurality of voters for an election comprising:

one or more biometric sensors, each biometric sensor having a resolution capability for generation of a unique and irreproducible sensor code for a voter for an inherently unique and irreproducible presentation of a biometric feature by the voter;

one or more electronic voting terminals, each voting terminal having a capability for generating a ballot code for the voter based upon ballot selections by the voter at the terminal;

database of unique and irreproducible ballot security codes, each ballot security code comprised of a unique and irreproducible security code appended to or linked to a ballot code, the security code being determined based upon the sensor code;

registration database of security codes;

biometric identification system having a capability for determining if the security code component of the ballot security code is within a voter template of the security code component of any previously stored ballot security code and for determining if any of the security codes from the registration database has been fraudulently reused to fraudulently generate the security code component of the ballot security code;

one or more computers for the database, the registration database, and the biometric identification system; and communications links between the biometric sensors, the voting terminals, and the one or more computers.

40. Voting system for taking and counting votes of a plurality of voters for an election comprising:

database of unique and irreproducible ballot security codes, each ballot security code comprised of a unique and irreproducible security code appended to or linked to a ballot code;

one or more biometric sensors, each biometric sensor having a resolution providing for generation of a unique and irreproducible sensor code for an inherently unique and irreproducible presentation of a biometric feature by a voter;

registration database of security codes;

biometric identification system for generating a unique and irreproducible security code for each unique and irreproducible sensor code and determining if the unique and irreproducible security code is within a voter template of the security code component of any ballot security code of the database and for determining if any of the security codes from the registration database has been fraudulently reused to fraudulently generate the security code component of the ballot security code;

one or more electronic voting terminals for generating a ballot code based upon ballot selections by the voter for the election and appending or linking the ballot code to the unique and irreproducible security code, generating a unique and irreproducible ballot security code;

one or more computers for the database, the registration database, and the biometric identification system; and communications links between the biometric sensors, the voting terminals, and the one or more computers.

* * * * *